US005639731A

United States Patent [19]
Newsholme et al.

[11] Patent Number: 5,639,731
[45] Date of Patent: Jun. 17, 1997

[54] AMINO ACIDS FOR THE PREPARATION OF A BEVERAGE

[76] Inventors: Eric Arthur Newsholme, 3 Cooper Close, Chipping Norton, Oxfordshire, England; Eva Blomstrand, Illerstigen 22, S-171 71 Solna, Sweden; Björn Ekblom, Backstigen 4, S-130 12 Älta, Sweden; Kjell Ericson, Bragevägen 14, S-194 54 Upplands Väsby, Sweden

[21] Appl. No.: 469,777

[22] Filed: Jun. 6, 1995

Related U.S. Application Data

[63] Continuation of Ser. No. 127,489, Sep. 28, 1993, abandoned, which is a continuation of Ser. No. 438,436, filed as PCT/SE88/00273, May 24, 1988, published as WO88/09132, Dec. 1, 1988, abandoned.

[30] Foreign Application Priority Data

| May 22, 1987 | [GB] | United Kingdom | 8712159 |
| May 22, 1987 | [GB] | United Kingdom | 8712160 |

[51] Int. Cl.⁶ ........................ A61K 31/70; A61K 31/715
[52] U.S. Cl. .............................. 514/23; 514/53; 514/54; 426/590; 426/656; 426/658
[58] Field of Search .................. 514/54, 53, 23; 426/29, 590, 656, 658; 536/18.7

[56] References Cited

U.S. PATENT DOCUMENTS

| 3,897,570 | 7/1975 | Yokotsuka et al. | 426/46 |
| 3,908,021 | 9/1975 | Rehberger et al. | 426/16 |
| 3,950,529 | 4/1976 | Fischer et al. | |
| 4,073,947 | 2/1978 | Witt | 426/16 |
| 4,228,099 | 10/1980 | Walser | 562/561 |
| 4,312,856 | 1/1982 | Korduner et al. | 514/54 |
| 4,357,343 | 11/1982 | Madsen et al. | |
| 4,438,144 | 3/1984 | Blackburn | |
| 4,649,051 | 3/1987 | Gyllang et al. | 514/23 |
| 4,902,517 | 2/1990 | Nakagawa et al. | 426/42 |

FOREIGN PATENT DOCUMENTS

| 5750305 | 3/1982 | Japan |
| 5746289 | 3/1982 | Japan |
| 5746401 | 3/1982 | Japan |
| 5885238 | 5/1983 | Japan |
| 58201574 | 10/1983 | Japan |
| 58201575 | 10/1983 | Japan |
| 58204454 | 10/1983 | Japan |
| 5913887 | 1/1984 | Japan |
| 5914764 | 1/1984 | Japan |
| 5916384 | 1/1984 | Japan |
| 5954959 | 3/1984 | Japan |
| 5956535 | 3/1984 | Japan |
| 5956791 | 3/1984 | Japan |

OTHER PUBLICATIONS

P. Karlson, Introduction to Modern Biochemistry, 3rd Edition, pp. 25–31.
E. F. Coyle, "Carbohydrate Metabolism & Fatigue", Muscle Fatigue Biochemical & Physiological Aspects; pp. 153–164 (1991).
Eur. J. of Appl. Physiol, vol. 63, pp. 83–88 (1991).
Biochemistry of Exercise, p. 361 (1991).
J.R.Stroop, Journal of Experimental Psychology, vol. 18, No. 6, pp. 643–661 (1935).
C.M.MacLeod, Psychological Bulletin, vol.109, No.2, pp. 163–203.
S.Lichtman et al, Journ. of Psychosomatic Research, vol. 27, No. 1 pp. 54–52 (1983).
E.Blomstrand, Europ.Journal of Appl.Psysiology, p.443, col. 1–6 (1991).
P.Karlson, Academic Press, 3rd Ed., pp.269–270 and 309–313 (1971) "Introduction to Modern Biochemistry".
L.J. Desha, Organic Chemistry, 2nd Edition, pp. 341–354 (1952).

*Primary Examiner*—John Kight
*Assistant Examiner*—Everett White
*Attorney, Agent, or Firm*—Birch, Stewart, Kolasch & Birch, LLP

[57] ABSTRACT

The present invention is directed to a method of improving the mental performance during strenuous physical activity and for delaying mental exhaustion due to physical activity as well as to improve recovery to a person in need thereof which comprises administering a ready-to-drink beverage comprising from 2 to 40 g/l ready-to-drink beverage of branched chain amino acids, from 0 to 750 g/l ready-to-drink beverage of oligosaccharides and up to 55 g/l ready-to-drink beverage of monsaccharides.

13 Claims, No Drawings

AMINO ACIDS FOR THE PREPARATION OF A BEVERAGE

This application is a continuation of application Ser. No. 08/127,489 filed on Sep. 28, 1993, which is a continuation of application Ser. No. 07/438,436, filed as PCT/SE88/00273, May 24, 1988, published as WO88/09132, Dec. 1, 1988, both of which are now abandoned.

The present invention relates to the use of naturally occuring amino acids for the preparation of beverages or instant mixtures, which when ingested alleviate the feeling of tiredness and fatigue of mammals during and after endurance excercise or hard physical work and improve their physical and mental performance and recovery, and a method of improving the physical and/or mental performance during strenuous physical activity and delaying physical and mental exhaustion due to physical activity by ingestion of said beverage.

Beverages which during exercise rapidly provide liquid and carbohydrates to the body and thus maintain the blood sugar content and insulin level of the body, are previously known, sec. SE 6807617-3, U.S. Pat. No. 4,312,856 and U.S. Pat. No. 4,649,051.

It has also previously been suggested that mixtures of amino acids should be used for maintenance of the nitrogen balance when given as the sole source of nitrogen in the diet and for the treatment of uremic conditions (cf. the Physicians' Desk Reference, 31:st Edition 1977 by Charles E. Baker, p. 1566 and U.S. Pat. No. 3,764,703). It is also previously known that amino acids have an unpleasant bitter taste and a limited solubility and attempts to solve said problems are suggested in U.S. Pat. No. 4,228,099.

It has previously been suggested that there may be a relationship between the concentration of various amino acids in the blood stream and the improvement in mood during endurance exercise.

The concentration of the aromatic amino acids, phenylalanine, tyrosine and tryptophan and the branched-chain amino acids valine, leucine and isoleucine are particularly pertinent but no suggestion has been made as to how to improve the physical or mental performance of mammals during and after endurance exercise or alleviate fatigue induced by exercise or other hard physical work.

With the present invention it has surprisingly been discovered that a beverage or an instant mixture comprising non-toxic amounts of the naturally occuring branched-chain amino acids, valine, leucine and isoleucine, optionally together with mono and/or oligosaccharides and optionally physiologically acceptable food acids and/or salts thereof, alkalizing agent, flavoring and aroma agents, leads to improved physical and mental performance during strenuous physical activity and delays the physical and mental exhaustion as well as improve recovery due to physical activity.

The beverage or instant mixture shall contain at least one of the branched-chain amino acids valine, leucine and isoleucine but contains preferably at least two and most preferably all three branched-chain amino acids.

The maximum amounts of the branched-chain amino acids in the product according to the invention will, since the toxicity of the amino acids in question is low, be determined by such factors as the solubility of the amino acids, the taste of the product and also the economical aspect.

The minimum amounts of branched-chain amino acids in the product according to the invention are the amounts required to maintain the amino acid concentration in the blood stream.

The exact dose depends on such factors as the effect to be achieved, the nature of the exercise undertaken, the route of administration and the body weight of the subject and is such that by ingestion of adequate amounts before, during and after the exercise or work, the amino acid concentration in the blood stream is maintained and preferably increased. The included amounts are generally in the region of from 2 to 40, preferably from 2 to 20 grams total branched-chain amino acids per liter ready-to-drink beverage. Leucine is included in the product in an amount of from 0 to 20 grams per liter, preferably 0 to 10 grams per liter; isoleucine in an amount of from 0 to 10 grams per liter, preferably 0 to 5 grams per liter and valine in an amount of from 0 to 15 grams per liter, preferably from 0 to 8 grams per liter with the proviso that the minimum amounts are not less than 2 grams per liter of ready-to-drink beverage.

The beverage or instant mixture should preferably further contain at least 1 gram per liter ready-to-drink beverage of mono and/or oligosaccharides to prevent hypoglycemia, an amount which preferably makes the ready-to-drink beverage hypotonic to facilitate a rapid transport through pylorus to the intestine where it is rapidly taken up by the blood stream and maintains an appropriate blood glucose level.

The amounts of oligosaccharides included in the beverage or instant mixture are such that the ready-to-drink beverage contains from 1 to 750 grams per liter, preferably 5 to 500 grams per liter and most preferably 50 to 100 grams per liter. The oligosaccharides have an average molecular weight in the range of 500 to 2500 and a DE value of 6 to 40.

Monosaccharides may also be included in an amount of up to 55 grams per liter ready-to-drink beverage, preferably 0 to 10 and most preferably 0 to 2 grams per liter.

The ready-to-drink beverage shall preferably be hypotonic, that is, have an osmotic pressure lower than the normal pressure of blood plasma and be in the range of 50 to 400 mOsmol/Kg, in order to be rapidly distributed from the ventricle. The osmotic pressure shall preferably be within the range of 50 to 300 mOsmol/kg, most preferably 50 to 250 mOsmol/kg.

Physiologically acceptable edible acids and/or salts thereof and/or alkalizing agents as e.g. sodium or potassium bicarbonate may be included in order to achieve an appropriate pH-value, that is, within the range of 3.0 to 8.0, preferably 3.0 to 4.5.

The amount of alkalizing agents may be from 0 to 10 grams per liter ready-to-drink beverage, preferably from 0.1 to 5 grams per liter.

The physiologically acceptable edible acids such as e.g. citric acid or citrate may be included in an amount of 0–2 grams per liter, preferably 0.1–1.6 grams per liter ready-to-drink beverage. Also equivalent amounts of maleic acids and/or maleate, tartaric acids and/or tartrates, orthophosphoric acid and/or corresponding phosphate may be included.

The beverage or instant mixture may also, with the aim of masking the bitter taste of the branched-chain amino acids, contain appropriate flavour or aroma agents in an amount adequate to mask the bitter taste. Such agents are preferably citrus oils or derivatives thereof.

Also, physiologically acceptable mineral salts normally present in body fluid, which during exercise are secreted with the perspiration, may be included in an amount of 0 to 10 grams per liter ready-to-drink beverage, preferably 0 to 5 grams per liter and said salts may be NaCl, KCl, $NaH_2PO_4$ and $KH_2PO_4$.

The amino acid or amino acids may be administered before, during and/or after the exercise although it is presently contemplated that the amino acids would be administered before the exercise or hard physical work, and for exercises or work of long duration during the exercise in order to improve physical and/or mental performance during the exercise or work. Administration after exercise is contemplated in order to improve recovery and prevent or delay post-exercise physical exhaustion and especially post-exercise mental exhaustion.

Thus, the invention contemplates the use of from 2 to 40 grams of the naturally occuring branched-chain amino acids in a beverage or instant mixture comprising at least 1 gram of mono- and/or oligosaccharides per liter ready-to-drink beverage and optionally adequate amounts of physiologically acceptable food acids and/or salts thereof, alkalizing agents, flavouring and aroma agents; wherein said beverage or instant mixture improves the physical and mental performance during strenuous physical activity by ingestion of an amount which maintains or preferably increases the amino acid concentration in the blood stream.

The invention further comprises a method of improving the physical and/or mental performance during strenuous physical activity and the delaying of physical and mental exhaustion due to physical activity by ingestion of the ready-to-drink beverage in an amount which maintains or preferably increases the amino acid concentration in the blood stream.

The invention will be further illustrated by the following Examples:

Beverage and Instant Mixtures

Example 1

|  | grams/liter |
| --- | --- |
| Leucine | 8.0 |
| Isoleucine | 6.0 |
| Valine | 6.0 |
| Oligosaccharides | 1.4 |
| DE = 40 | |
| Average molecular weight 500 | |
| Fructose | 1.1 |
| Citric acid | 0.25 |
| Trisodiumcitrate | 0.066 |
| Flavouring agent | 0.27 |

The stated ingredients are mixed into an instant mixture which is packed air-tight; or the ingredients may be mixed in appropriate amounts of water.

Ready-to-Drink Beverage

The instant mixture in the stated amounts is then dissolved in 1 liter of water for use, either by the manufacture at the plant or by the user. The ready-to-drink beverage has a pH of 4.4 and an osmotic pressure ($\pi$) of 190 mOsmol/kg.

Example 2

|  | grams/liter |
| --- | --- |
| Leucine | 7.05 |
| Isoleucine | 3.45 |
| Valine | 4.50 |
| Oligosaccharides | 75.00 |
| DE = 17 | |
| Average molecular weight 1887 | |
| Citric acid | 1.68 |
| Trisodiumcitrate | 0.38 |
| NaCl | 0.40 |
| KCl | 0.05 |

-continued

|  | grams/liter |
| --- | --- |
| $NaH_2PO_4.2H_2O$ | 0.05 |
| $KH_2PO_4$ | 0.15 |
| $NaHCO_3$ | 0.05 |
| $KHCO_3$ | 0.05 |
| Flavouring agent | 0.05 |

The beverage or instant mixture is mixed and packed as above.

Ready-to-Drink Beverage

The instant mixture is dissolved as above in 1 liter of water. The pH of the ready-to-drink beverage is 3.8 and the osmotic pressure ($\pi$) 225 mOsmol/kg.

Example 3

|  | grams/liter |
| --- | --- |
| Leucine | 5.65 |
| Isoleucine | 2.75 |
| Valine | 3.60 |
| Oligosaccharides | 75.00 |
| DE = 24 | |
| Average molecular weight 1460 | |
| Citric acid | 1.53 |
| Trisodiumcitrate | 0.42 |
| NaCl | 0.35 |
| KCl | 0.1 |
| $NaH_2PO_4.2H_2O$ | 0.1 |
| $KH_2PO_4$ | 0.1 |
| $NaHCO_3$ | 0.1 |
| Flavouring agent | 0.1 |

The beverage or instant mixture is mixed and packed as above.

Ready-to-Drink Beverage

The instant mixture is dissolved as above in 1 liter of water. The pH of the ready-to-drink beverage is 3.8 and the osmotic pressure ($\pi$) 230 mOsmol/kg.

Example 4

|  | grams/liter |
| --- | --- |
| Leucine | 4.70 |
| Isoleucine | 2.35 |
| Valine | 2.95 |
| Oligosaccharides | 75.00 |
| DE = 29 | |
| Average moleculare weight 1167 | |
| Citric acid | 1.38 |
| Trisodiumcitrate | 0.46 |
| NaCl | 0.30 |
| KCl | 0.15 |
| $NaH_2PO_4$ | 0.20 |
| $NaHCO_3$ | 0.15 |
| Flavouring agent | 0.15 |

The beverage or instant mixture is mixed and packed as above.

Ready-to-Drink Beverage

The instant mixture is dissolved as above in 1 liter of water. The pH of the ready-to-drink beverage is 3.9 and the osmotic pressure ($\pi$) 235 mOsmol/kg.

Example 5

|  | grams/liter |
| --- | --- |
| Leucine | 8.0 |
| Isoleucine | 4.0 |
| Oligosaccharides<br>DE = 24<br>Average molecular weight 1460 | 75.00 |
| Citric acid | 1.30 |
| Trisodium citrate | 0.33 |
| NaCl | 0.25 |
| KCl | 0.20 |
| $NaH_2PO_4 \cdot 2H_2O$ | 0.25 |
| $KH_2PO_4$ | 0.05 |
| $NaHCO_3$ | 0.10 |
| $KHCO_3$ | 0.10 |
| Flavouring agent | 0.5 |

The beverage or instant mixture is mixed and packed as above.

Ready-to-Drink Beverage

The instant mixture is dissolved as above in 1 liter of water. The pH of the ready-to-drink beverage is 3.6 and the osmotic pressure ($\pi$) 225 mOsmol/kg.

Example 6

|  | grams/liter |
| --- | --- |
| Leucine | 10.0 |
| Oligosaccharides<br>DE = 29<br>Average molecular weight 1167 | 75.00 |
| Citric acid | 1.22 |
| Trisodiumcitrate | 0.73 |
| NaCl | 0.20 |
| KCl | 0.25 |
| $NaH_2PO_4 \cdot 2H_2O$ | 0.30 |
| $KHCO_3$ | 0.10 |
| Flavouring agent | 0.85 |

The beverage or instant mixture is mixed and packed as above.

Ready-to-Drink Beverage

The instant mixture is dissolved as above in 1 liter of water. The pH of the ready-to-drink beverage is 4.3 and the osmotic pressure ($\pi$) 237 mOsmol/kg.

Example 7

|  | grams liter |
| --- | --- |
| Leucine | 8.0 |
| Valine | 4.0 |
| Oligosaccharides<br>DE = 7<br>Average molecular weight 2500 | 75.00 |
| Citric acid | 1.8 |
| $NaHCO_3$ | 2.5 |
| $KHCO_3$ | 2.5 |
| Flavouring agent | 1.25 |

The beverage or instant mixture is mixed and packed as above.

Ready-to-Drink Beverage

The instant mixture is dissolved as above in 1 liter of water. The pH of the ready-to-drink beverage is 7.8 and the osmotic pressure ($\pi$) 270 mOsmol/kg.

TESTS

Example I

Three individuals each drank a solution containing 10 g of three branched-chain amino acids (2.3 g isoleucine, 3 g valine, 4.7 g leucine) and blood samples were taken 0, 15, 80 and 170 minutes after ingestion for measurement of total branched-chain amino acid concentration. Results are given in Table 1.

TABLE 1

| | Plasma conc. ($\mu$M) of branched-chain amino acid<br>Time after ingestion (min) | | | |
| --- | --- | --- | --- | --- |
| Individual | 0 | 15 | 80 | 170 |
| 1 | 390 | 764 | 1565 | 840 |
| 2 | 420 | 954 | 1288 | 697 |
| 3 | 363 | 1470 | 1365 | 687 |
| Mean | 391 | 1053 | 1406 | 741 |

Example II

Two volunteers were each given 1.5 g of branched-chain amino acid in 150 ml water to drink 7 minutes before the start of a run and another 1.5 g in 150 ml water 23 minutes after the start of the run. Blood samples were taken approximately 10 minutes before the first drink, 20 minutes and 60 minutes after the start of the run. Branched-chain amino acid concentrates were measured enzymatically. Results are shown in Table 2.

TABLE 2

| | Plasma conc. ($\mu$M) of branched-chain amino acids<br>Time of running (min.) | | |
| --- | --- | --- | --- |
| Individual | −17 | 20 | 60 |
| 1 | 460 | 450 | 660 |
| 2 | 365 | 520 | 590 |

Example III

Eight volunteers participated in the test which took place on the same day of the week during two subsequent weeks and with approximately the same outdoor temperature and weather conditions. The running distance was 24 kilometers. Each of the volunteers obtained before the start and after 13 kilometers running, a beverage containing 2.5 grams of branched-chain amino acids of the same composition as the two previous tests or flavoured water (placebo). The results of experienced physical effort are disclosed in Table 3a and the results of mental effort in Table 3b.

TABLE 3a

| | Ingested drink | |
| --- | --- | --- |
| Running distance | Branched-chain amino acid | Placebo |
| 0–13 km | 2.3 | 2.3 |
| 13–18 km | 2.5 | 2.0 |
| 18–24 km | 2.1 | 1.5 |

TABLE 3b

| | Ingested drink | |
| --- | --- | --- |
| Running distance | Branched chain amino acids | Placeo |
| 0–13 km | 2.1 | 2.4 |
| 13–18 km | 2.8 | 2.0 |
| 18–24 km | 2.6* | 1.5 |

*Indicates $p < 0.05$ as compared with Placebo

The figures of Tables 3a and 3b are the mean values (n=8) of the estimated physical (3a) and mental (3b) efforts, wherein in an estimation scale:

The score 1 is rated as heavy

The score 2 is rated as medium

The score 3 is rated as easy.

The test also shows a decrease in plasma concentration of branched-chain amino acids during the running if only placebo was obtained, while ingestion of 5 grams of branched-chain amino acids increased the concentration of branched-chain amino acids in the plasma. The concentration at the end of the run was an average of 30% higher than before the start.

TABLE 3c

| | Plasma conc. of branched-chain amino acids | | | |
| --- | --- | --- | --- | --- |
| | Branched chain amino acid-drink | | Placebo | |
| Subject | Before | After | Before | After |
| 1 | 542 | 633 | 498 | 368 |
| 2 | 378 | 507 | 442 | 611 |
| 3 | 517 | 382 | 333 | 313 |
| 4 | 387 | 457 | 407 | 208 |
| 5 | 367 | 536 | 277 | 303 |
| 6 | 378 | 581 | 498 | 298 |
| 7 | 368 | 507 | 528 | 253 |
| 8 | 478 | 705 | 447 | 368 |
| Mean | 427 | 538 | 429 | 340 |
| SE | 21.3 | 35.8 | 30.7 | 43.1 |

SE = Standard error of the mean

The figures refer to the plasma concentration ($\mu M$) of branched chain amino acids of each of the 8 subjects participating in the test.

Example IV

Six well-trained male volunteers obtained each at two separate long distance runs (30 kilometers indoor running) either Pripps Pluss® (commercially available sport drink sold by AB Pripps Bryggerier, Stockholm, Sweden) or the beverage according to Example 3 in the amounts stated in Table 4.

Blood samples were taken before and immediately after the runs for analysis of the concentrations of branched-chain amino acids and glucose.

The running time varied between 1 h, 52 min and 2 h, 18 min but all subjects ran the two races within an individual time difference of 2 min, 30 sec. All of the subjects felt it was "easier" to run after ingestion of the beverage according to the invention.

During the run the plasma concentration of glucose increased from an average of 5.3 to 7.4 mM when the beverage according to the invention was obtained and from 5.0 to 6.6 mM when Pripps Plus® was obtained. The plasma concentration of branched-chain amino acids increased from an average of 431 to 945 $\mu M$ when drinking the beverage according to the invention while the concentration decreased from 464 to 354 $\mu M$ when drinking Pripps Pluss®.

The conclusion is that the beverage according to the invention has an effect on mental fatigue as well as physical tiredness.

TABLE 4a

| | Plasma concentration ($\mu M$) of branched-chain amino acids | | | | |
| --- | --- | --- | --- | --- | --- |
| | Beverage according to Example 3 | | | Pripps Pluss ® | |
| Sub-ject | Ingested amount (1) | Plasmaconc. of BCAA | | Ingested amount (1) | Plasmaconc. of BCAA | |
| | | Before | After | | Before | After |
| 1 | 0.92 | 458 | 1379 | 0.81 | 487 | 420 |
| 2 | 0.60 | 363 | 625 | 0.60 | 382 | 320 |
| 3 | 0.45 | 406 | 940 | 0.55 | 396 | 348 |
| 4 | 0.92 | 453 | 1350 | 0.87 | 558 | 267 |
| 5 | 0.43 | 434 | 639 | 0.46 | 487 | 425 |
| 6 | 0.50 | 473 | 735 | 0.63 | 473 | 344 |
| Mean | 0.64 | 431 | 945* | 0.65 | 464 | 354* |
| SE | | 16.6 | 141 | | 26.7 | 24.7 |

*Indicates $p < 0.05$ as compared with the "Before" value

The figures refer to ingested amounts of beverage in liters during the test run and the plasma concentration of branched-chain amino acids before and after the test run.

TABLE 4b

| | Plasma concentration ($\mu M$) of glucose (Ingested amounts as in Table 4a) | | | |
| --- | --- | --- | --- | --- |
| | Beverage according to Example 3 | | Pripps Pluss ® | |
| Subject | Before | After | Before | After |
| 1 | 5.7 | 8.3 | 5.6 | 8.5 |
| 2 | 3.2 | 7.0 | 3.2 | 5.5 |
| 3 | 5.3 | 7.5 | 4.9 | 6.1 |
| 4 | 6.1 | 9.4 | 5.4 | 8.6 |
| 5 | 5.8 | 6.1 | 5.8 | 6.1 |
| 6 | 5.5 | 6.3 | 5.3 | 4.8 |
| Mean | 5.3 | 7.4* | 5.0 | 6.6 |
| SE | 0.43 | 0.51 | 0.30 | 0.65 |

*Indicates $p < 0.05$ as compared with the "Before" value

We claim:

1. A method of improving mental performance during strenuous physical activity and for delaying mental exhaustion due to physical activity as well as improving recovery following physical activity in a person in need thereof, the method comprising:

ingesting a ready-to-drink beverage having a pH of 3.0 to 8.0 and an osmotic pressure of from 50 to 400 m Osmol;

wherein the ready-to-drink beverage comprises from 2 to 40 g/l of branched chain amino acids, from 50 to 750 g/l of oligosaccharides, up to 55 g/l of monosaccharides, 0.1–2 g/l of physiologically acceptable edible acids, 0.1–10 g/l of alkalizing agents, up to 10 g/l of physiologically acceptable mineral acids, and aroma or flavoring agents in an amount which masks the bitter taste of said branched chain amino acids.

2. The method according to claim 1, wherein said branched chain amino acids in the beverage are selected from the group consisting of:

0 to 20 g/l leucine, 0 to 10 g/l isoleucine, 0 to 15 g/l valine, or a mixture thereof;

with the proviso that the minimum amount of the branched chain amino acids in the beverage is not less than 2 g/l of the ready-to-drink beverage.

3. The method according to claim 1, wherein said branched chain amino acids in the beverage are selected from the group consisting of:

0 to 10 g/l leucine, 0 to 5 g/l isoleucine, 0 to 8 g/l valine, or a mixture thereof;

with the proviso that the minimum amount of the branched chain amino acids in the beverage is not less than 2 g/l of the ready-to-drink beverage.

4. The method according to claim 1, wherein said beverage comprises 5 to 500 g/l of oligosaccharides.

5. The method according to claim 4, wherein said beverage comprises 50 to 100 g/l of oligosaccharides.

6. The method according to claim 1, wherein said beverage comprises up to 10 g/l monosaccharides.

7. The method according to claim 6, wherein said beverage comprises up to 2 g/l of monosaccharides.

8. The method according to claim 7, wherein said beverage has a pH of 3.0 to 4.5.

9. The method according to claim 1, wherein said beverage has an osmotic pressure of from 50 to 300 m Osmol/kg.

10. The method according to claim 1, wherein said beverage comprises 0.1 to 1.6 g/l of said physiologically acceptable edible acids, 0.1 to 5 g/l of said alkalizing agents, and up to 5 g/l of said mineral acids.

11. The method according to claim 1, wherein said beverage further comprises citric acid, citrate, or a mixture thereof; sodium or potassium bicarbonate; and NaCl, $NaH_2PO_4$ or $KH_2PO_4$.

12. The method according to claim 1, wherein said beverage further comprises as said aroma flavoring agent a citrus oil or a derivative thereof.

13. The method according to claim 1, wherein said beverage is administered to said person prior to or during said strenuous activity.

* * * * *

UNITED STATES PATENT AND TRADEMARK OFFICE
CERTIFICATE OF CORRECTION

PATENT NO. : 5,639,731
DATED : June 17, 1997
INVENTOR(S) : Eric Arthur NEWSHOLME et al.

It is certified that error appears in the above-identified patent and that said Letters Patent is hereby corrected as shown below:

TITLE PAGE:
Item [63] should read as follows:

--[63] Continuation of Ser. No. 127,489, Sep. 28, 1993, abandoned, which is a continuation of Ser. No. 438,436, Jan. 19, 1990, abandoned, filed as PCT/SE88/00273, May 24, 1988, published as WO88/09132, Dec. 1, 1988.

Signed and Sealed this

Twelfth Day of May, 1998

BRUCE LEHMAN

*Attest:*

*Attesting Officer*   *Commissioner of Patents and Trademarks*

UNITED STATES PATENT AND TRADEMARK OFFICE
CERTIFICATE OF CORRECTION

PATENT NO. : 5,639,731
DATED : June 17, 1997
INVENTOR(S) : Eric Arthur NEWSHOLME et al.

It is certified that error appears in the above-identified patent and that said Letters Patent is hereby corrected as shown below:

On the Title Page, insert the following:

--[73] Assignee: AB PRIPPS BRYGGERIER, Bromma, Sweden--

Signed and Sealed this

Twenty-ninth Day of June, 1999

Attest:

Q. TODD DICKINSON

*Attesting Officer*     *Acting Commissioner of Patents and Trademarks*